April 21, 1942.  T. WILSON  2,280,564
UNCOILING DEVICE
Filed Jan. 2, 1941   4 Sheets-Sheet 1
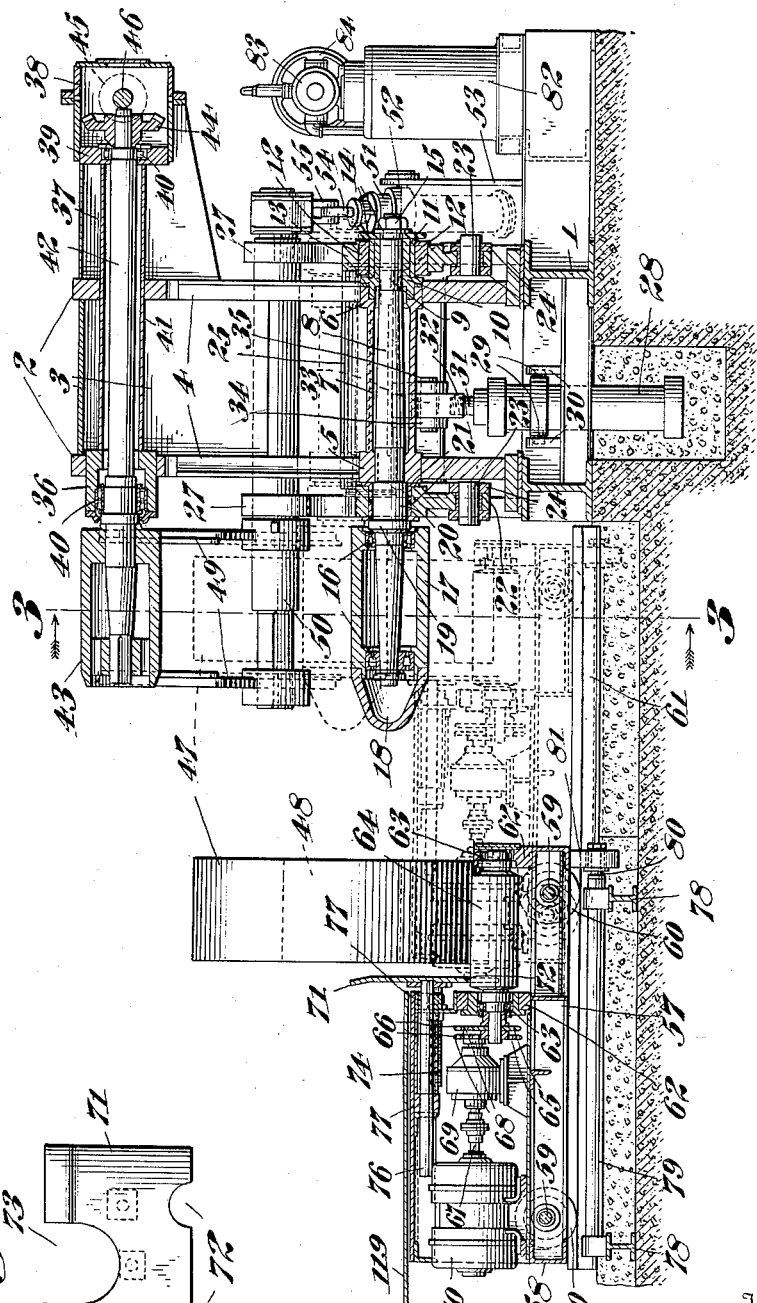
Inventor
Tom Wilson,
By N. S. C. Dougherty.
Attorney

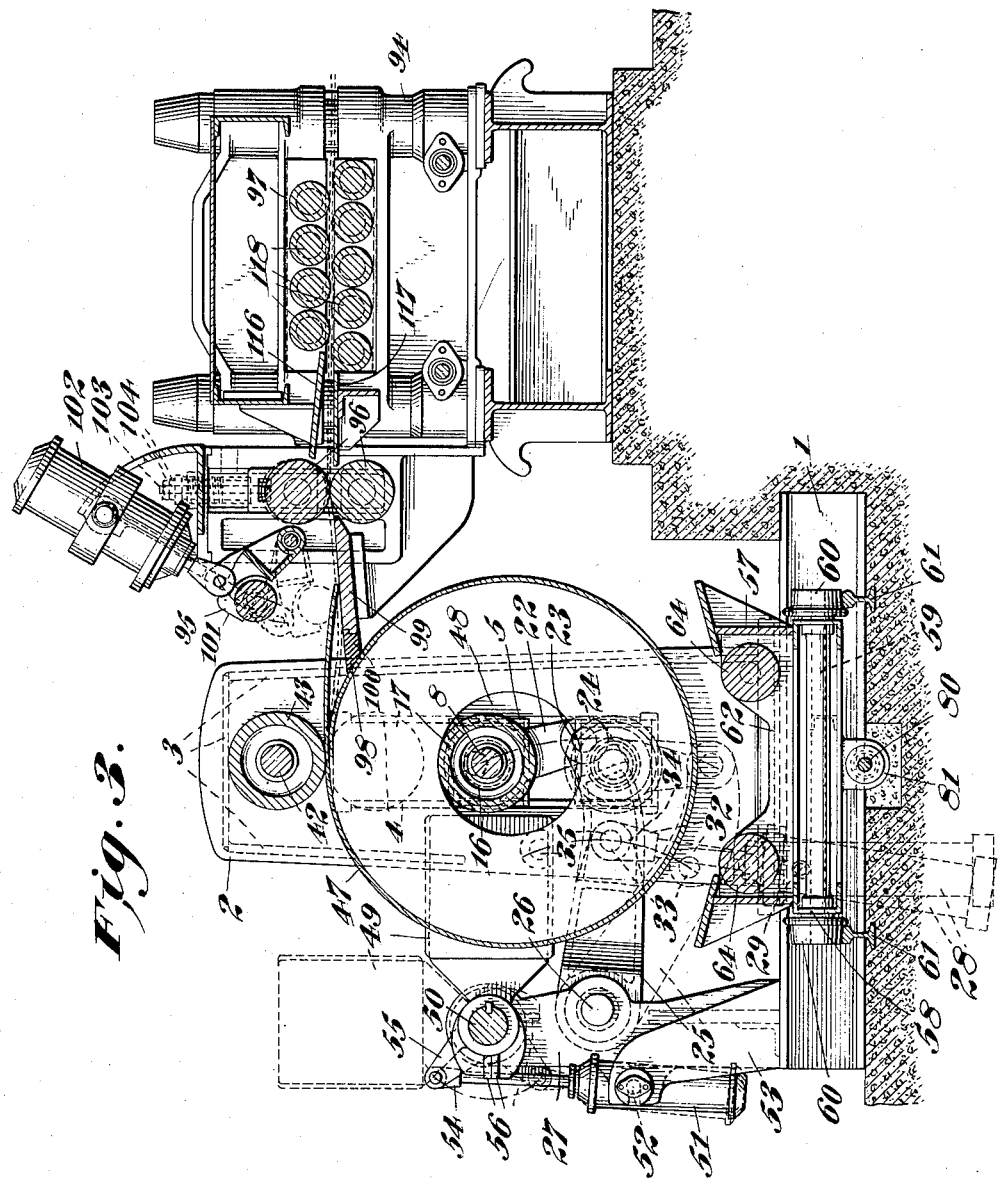

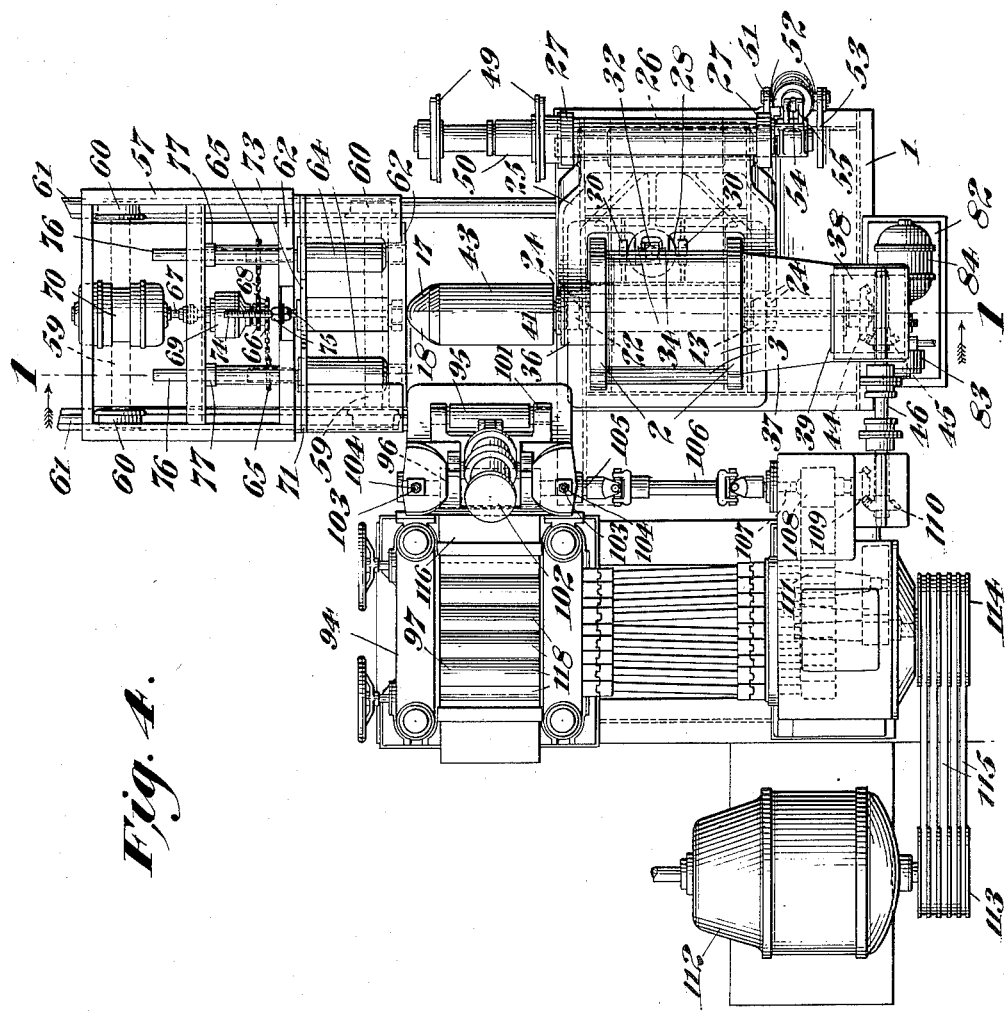

April 21, 1942.  T. WILSON  2,280,564
UNCOILING DEVICE
Filed Jan. 2, 1941  4 Sheets-Sheet 4

Inventor
Tom Wilson.
By R. S. A. Dougherty
Attorney

Patented Apr. 21, 1942

2,280,564

UNITED STATES PATENT OFFICE 2,280,564

UNCOILING DEVICE

Tom Wilson, Baltimore, Md., assignor to Bethlehem Steel Company, a corporation of Pennsylvania Application January 2, 1941, Serial No. 372,725

29 Claims. (Cl. 242—78)

This invention relates to an uncoiling and levelling device for feeding coiled metal strip to machines, and more particularly it relates to a device for handling uncoiling, levelling and feeding the heavy skelp required in the manufacture of the larger sizes of steel pipe and tubing to a continuous butt-weld pipe mill.

Hot rolled strips and plates of steel and wrought iron intended to be formed into pipes, tubes or tubing with welded, riveted or open joints, are known as skelp. For the larger customary sizes of butt-welded pipe, ¾ to 3 inches in nominal inside diameters (1.050 to 3.5 inches actual outside diameters), the skelp may range in width from $3\frac{1}{5}$ inches to 12 inches, in gauge from .113 inch to .600 inch, and in weight per foot from 1.230 pounds to 18.583 pounds. Still larger pipe will require skelp even wider and heavier than this.

In a continuous butt-weld pipe mill the skelp is used in the form of coils, and it is apparent that coils of skelp approaching fifteen inches in width and nearly four feet in outside diameter will form a considerable handling problem from the standpoint of weight alone. Coil boxes and expanding mandrel systems have been used, but are not entirely satisfactory. As the skelp has been coiled while hot from the run-out table and then allowed to cool, undue bending and cold working of the skelp must be avoided. Likewise coil bends must be straightened out before the skelp can be fed into the shears.

The shears cut off crop ends, and square the ends of the skelp. From the shears the skelp passes to an electric welding machine, wherein the forward end of the new coil is welded to the rear end of a fed coil. After being advanced in a trough or on a run-out table to form a long loop the skelp is fed through a furnace in which it is heated to a high temperature, through a forming bell and welding and sizing rolls, and is then cut into lengths.

The formed pipe after having been cut into lengths is passed through descaling rolls and finally is deposited on a hot bed for cooling.

One object of my invention is to provide an apparatus for continuously stripping the skelp from the coil.

Another object of my invention relates to the manner of feeding the coil to the mandrel.

Another object of my invention relates to the mechanism for retaining the coil in the desired position on the mandrel.

Another object of my invention relates to the manner of supporting and vertically adjusting the mandrel.

Another object is to supply a pulling means for unwinding the skelp.

Still another object is to provide a means for putting the skelp into properly flat condition for shearing.

Other objects, purposes, advantages and details of the invention will hereinafter appear in the specification and claims.

With the purpose of making my invention more clear, I shall now refer to the accompanying four sheets of drawings forming a part of this specification and in which like characters of reference indicate like parts.

Figure 1 is a longitudinal section of my uncoiling device, taken along the line 1—1 of Fig. 4;

Fig. 2 is a front view of the backing plate adapted to engage one end of the coil of skelp on the transfer car;

Fig. 3 is a transverse vertical section of my device taken along the line 3—3 of Fig. 1;

Fig. 4 is a top plan view of the device; and

Figure 5:
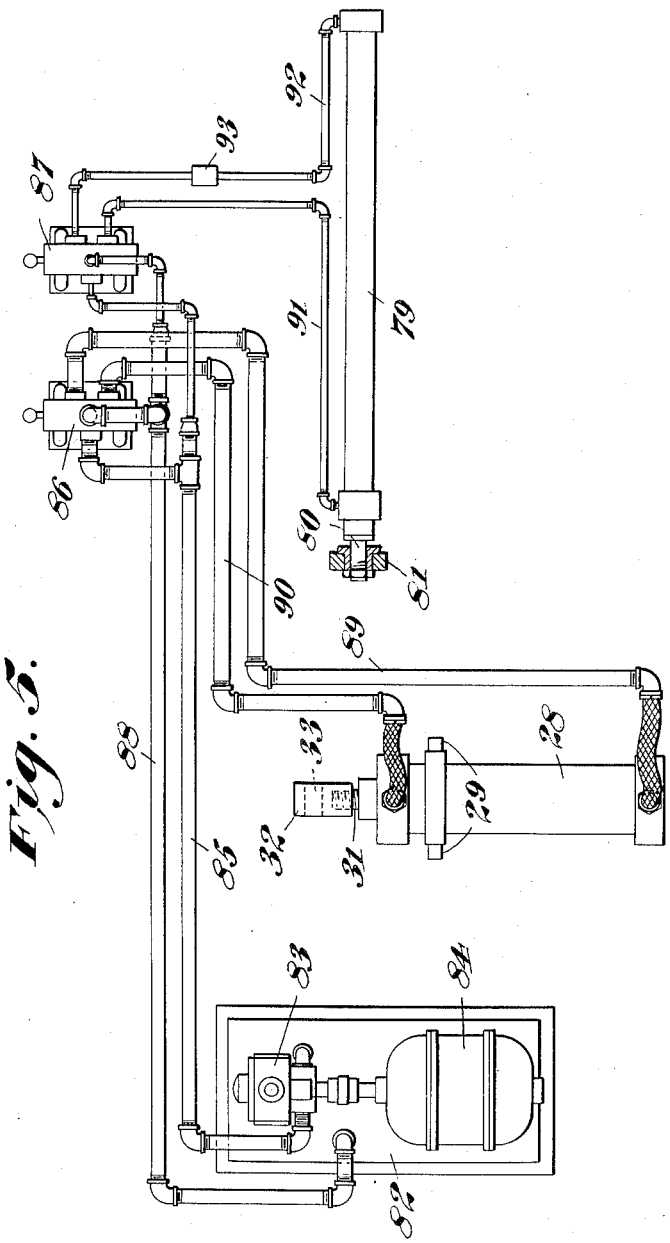
Fig. 5 is a schematic piping diagram of the fluid pressure system actuating transfer car and mandrel hoist lever-arm.

Referring now to the various characters of reference on the drawings, the numeral 1 designates the base of the uncoiling device upon which is mounted and secured a pair of side frame members 2 connected together at their top and sides by means of web plates 3. The pair of side frame members 2 are each provided with a vertical slideway 4 adapted to receive bearings 5 and 6 integrally connected together by means of a tubular portion 7 in which is mounted the mandrel shaft 8. One end 9 of the mandrel shaft 8 extends outwardly beyond the bearing 6 and is reduced to receive a thimble 10 having a bushing 11 mounted thereon adapted to receive bearing blocks 12 upon which is pivoted the upper end of a link 13, said parts being retained on the shaft by means of washers 14 and a nut threaded on the reduced end 9 of the mandrel shaft 8 as at 15. The opposite end of the mandrel shaft 8 extends outwardly from the bearing 5 for receiving roller bearings 16 upon which is mounted a mandrel 17 having a blunt end 18. At an intermediate point between the bearing 5 and the mandrel 17 the mandrel shaft 8 has an annular flange 19 coacting with the nut 15 for holding said shaft against longitudinal movement and an enlarged portion 20 with sleeves 21 thereon upon which is pivoted the upper end of a link 22. In order to raise and lower the mandrel 17 the lower ends of the links 13 and 22 are pivoted as at 23 to the inner bifurcated ends 24 of the side arms of a lifting lever 25, which has its outer end pivoted on a shaft 26 supported in pedestals 27. The lifting lever 25 is actuated by means of a fluid pressure hoisting cylinder 28, which is pivotally mounted by means of trunnions 29 extending laterally therefrom at opposite sides thereof which are journaled in bearings 30 that extend upwardly from the base 1 of the uncoiling device. The outer end of the piston rod 31 for the fluid pressure cylinder 28 is threaded to receive a pivotal block 32 which is perforated as at 33 and connected to perforated ears 34 extending from the intermediate portion of the lifting lever 25 by means of a pin 35.

Mounted in the side frame member 2 in vertical alignment above the bearing 5 is a bearing 36. In longitudinal alignment with bearing 36 the opposite side frame member 2 is provided with an outwardly extending bracket 37 for supporting a gear casing 38 and a journal bearing 39. The bearings 36 and 39 are provided with roller bearings 40 and are connected together by means of a tubular member 41. A feed roll shaft 42 is journaled in the roller bearings 40 of the bearings 36 and 39, having a feed roll 43 keyed to one end of the feed roll shaft 42 in vertical alignment with the mandrel 17 which is driven by means of a bevel gear 44 attached to the opposite end of the roll shaft 42 in the gear casing 38 which meshes with a bevel gear 45 on a driven shaft 46.

In making butt-welded pipe of different sizes the dimensions of the skelp and coils will obviously vary accordingly, and it is necessary to vertically adjust the mandrel 17 so that it will register with the central opening of the coil when the coil is placed on the mandrel. It is desirable also to have adjustable guards for holding the coil on the mandrel and for guiding the skelp during the uncoiling operation.

As indicated on the drawings a coil 47 having a central opening 48 is mounted on the mandrel 17 and is held in position thereon by means of a pair of guard arms 49 which during the unwinding operation are disposed at opposite ends of the coil. These adjustable guard arms are keyed to a shaft 50 which is journaled in the top ends of the pedestals 27. As indicated more clearly in Figs. 1 and 3 these guard arms are adapted to rotate through an arc of 90° so that they will be disposed vertically out of alignment with the coil when it is fed onto the mandrel, after which they are rotated to a horizontal position opposite adjacent ends of the coil. This is accomplished by means of an air cylinder 51 which has trunnions extending from its opposite sides which are journaled at 52 in an auxiliary pedestal 53 and one of the pedestals 27. The upper end of the piston-rod 54 for the air cylinder 51 is pivoted to a crank arm 55, and to limit the movement of the guard arms 49 they are provided with stops 56.

Adjacent to the uncoiling device and in longitudinal alignment with the mandrel 17 is a reciprocable transfer car 57 adapted to receive coils and feed them to the mandrel. This car is provided with a base frame 58 having transverse axles 59 for wheels 60 mounted on track rails 61. The car 57 at one end has a cradle comprising a pair of spaced transversely extending side frame members 62 in which the shafts of a pair of rollers 64 are journaled at 63 and adapted to receive a coil 47. The rear ends of each of the shafts of rollers 64 extend beyond one of the side frame members 62 of the cradle and are each provided with a sprocket-wheel 65 which is connected to sprocket-wheels 66 on a drive-shaft 67 by means of sprocket-chains 68. The drive shaft 67 is provided with differential speed-reducing gearing 69 and is driven by means of a motor 70. A backing plate 71 for engaging one end of the coil is mounted above the rear ends of the rollers 64 having cut-out portions as at 72 and 73 for the passage of rollers 64 and mandrel 17, respectively. This backing plate 71 is secured to the superstructure of the car 57 by means of an adjusting bolt 74 provided with nuts 75 for adjustment and guide rods 76 slidably mounted in keepers 77. Mounted on a pair of I-beams 78 beneath the car 57 is a fluid pressure cylinder 79 having the outer end of its piston-rod 80 attached to a lug 81 projecting downwardly from the front end of the base frame 58 of the car 57 by means of which the car is reciprocated.

In Fig. 5 I have illustrated diagrammatically the manner of controlling the fluid pressure to and from the cylinders 28 and 79, in which 82 indicates a reservoir tank from which a fluid, preferably oil, is supplied under pressure. Said fluid is drawn from the reservoir tank by pressure pump 83 driven by motor 84 and is impelled by said pump through pipe 85 to four-way valves 86 and 87 for controlling the supply to and from the cylinders 28 and 79, and 88 is the pipe for the spent fluid which is returned to the reservoir from the valves 86 and 87. The four-way valve 86 is connected to opposite ends of the cylinder 28 by means of pipes 89 and 90, while the four-way valve 87 is connected to opposite ends of the cylinder 79 by means of pipes 91 and 92. Pipe 92 also has a speed control check valve 93 therein for controlling the advancing movement of the car.

The coil 47 after it has been placed on the mandrel 17 is further elevated to engage tightly the upper surface of the coil with the driven feed roll 43. A straightening device mounted adjacent to the uncoiler in a frame 94 comprises pressure roll 95, pinch rolls 96 and leveller 97. To start the feed of the skelp to the straightening device, and as skelp especially for the larger sized pipes is of considerable thickness and stiffness, it is necessary first to loosen the outside end of the coil, either by directly engaging the beveled edge 98 of a stripper plate 99 formed integral therewith, or by the use of a separate bar 100 as indicated in Fig. 3 held at one end by an operator and braced at the side edge against the edge of the stripper plate and withdrawn after the end of the skelp has been fed into the straightening device. After the fed end of the coil has been loosened and advanced by means of the feed roll 43 it is passed by tongs or the like beneath the reciprocating pressure roll 95, which is mounted in pivoted arm 101 adapted to be advanced or retracted by means of a pivoted air cylinder 102, said pressure roll 95 for convenience being normally in the up position, over the stripper plate 99. The end of the skelp is then passed between the pair of pinch rolls 96, the upper one of which is adjustable vertically by set bolts 103 and held in position by nuts 104 and is driven simultaneously with the feed roll 43 through shaft 105, universal coupling 106 and shaft 107 having a pinion 108 and beveled gear 109 mounted thereon. The beveled gear 109 meshes with a beveled gear 110 on the driven shaft 46 while the pinion 108 engages a train of reduction gearing 111 which is driven by the motor 112 through sheaves 113 and 114 which are connected by means of belt 115.

The skelp passes thereafter between converging guide plates 116 and 117, and then between the levelling rolls 118, which comprise two sets of small rolls one set above the other and in staggered relation to the other which may be driven in any approved manner by means of the motor 112.

Having thus given a detailed description of the invention, I shall now describe its operation:

Assuming the car to be in retracted position and partially under the floor 119 of the mill as indicated in Fig. 1, a coil of skelp 47 is rolled from a platform or deposited by an overhead crane on the like (not shown) in an upright position upon the rollers 64 between the side cradle members 62 on the transfer car 57. The operator then manipulates the four-way valve 86 to admit fluid pressure into the cylinder 28 to align the mandrel 17 with the central opening 48 through the coil 47, and four-way valve 87 is operated to admit fluid pressure through pipe 92 to the rear end of the cylinder 79, thereby reciprocating the car 57 and coil of skelp 47 mounted thereon from the position shown in full lines to the dotted line position. The coil having been placed on the mandrel 17, air pressure or the like is admitted to the lower end of cylinder 51 thereby rotating the guard arm 49 from the vertical position to a horizontal position at opposite ends of the coil, and the four-way valve 86 is again manipulated to raise the mandrel and coil off the car until the outer surface of the coil tightly engages the feed roll 43. In this operation the beveled edge 98 of the stripper plate 99 or the beveled edge of an inserted bar 100 will come into engagement with the side surface of the coil 47 as indicated in Fig. 3. The mandrel 17 is not driven but is free to rotate on the roller bearing 16 on the mandrel shaft 8. The feed roll 43 is now rotated by the motor 112 to rotate the coil, thereby raising the outer end of the coil so that the skelp will pass over the stripper plate 99 and be engaged and initially straightened by the pressure roll 95. Thence the skelp passes between the pinch rolls 96, converging guide plates 116 and 117, and finally between the leveling rolls 118. After the outer end of the skelp has been fed between pinch rolls 96 and levelling rolls 118, the mandrel 17 and coil 47 may remain in this position and be fed to the straightening device in this manner, but in the case of large coils which are very heavy I prefer after the starting operation to lower the coil until it is seated on rollers 64 of the cradle which are driven by means of the motor 70 on the car 57. In this position the coil may be uncoiled totally, or it may be partially uncoiled, and then raised again into engagement with the feed roll 43, whereupon the car may be retracted and another coil placed on the cradle of the car while the final uncoiling of the original coil proceeds. In this manner but a few seconds are required to insert a new coil in the uncoiler, and as the loop on the run-out table or floor is of considerable length only a part of it will be taken up and fed into the furnace before the rear end of the fed coil is welded to the outer end of the new coil so that the feeding operation to the furnace is continuous.

For illustration, I have described my invention in detail only as adapted for the feeding of skelp to pipe-making machines, but I wish it clearly understood that it may be used for the handling of other forms of metal strip and the like without departing from the essence and spirit of my invention, and that without limitation to the exact and specific details I have shown and described I may use such substitutions, modifications or equivalents thereof as are embraced without the scope of my invention or as are pointed out in the claims.

Having thus described my invention, what I claim as new and desire to secure by Letters Patent is:

1. A device for uncoiling skept or the like comprising a mandrel, means for conveying a coil of skelp to the mandrel, a feed roll for engaging the coil on the mandrel, means for raising the coil on the mandrel into engagement with the feed roll, and means for rotating the feed roll to uncoil the skelp and advance the same.

2. A device for uncoiling skelp or the like comprising a mandrel, mean for conveying a coil of skelp to the mandrel, a feed roll for engaging the coil on the mandrel, pinch rolls mounted adjacent to the feed roll and the mandrel, means for raising the coil on the mandrel into engagement with the feed roll, and means for rotating the feed roll and the pinch rolls to uncoil the skelp and advance the same.

3. A device for uncoiling skelp or the like comprising a reciprocable transfer car for initially receiving a coil of skelp, means for reciprocating the car, a rotatable mandrel mounted adjacent thereto, means for raising and lowering the mandrel, a feed roll above the mandrel, and means for rotating the feed roll.

4. A device for uncoiling skelp or the like comprising a reciprocable transfer car for initially receiving a coil of skelp, driving rollers on the car and frictionally engaging the coil to rotate the coil, means for rotating the rollers, means for reciprocating the car, a mandrel adjacent thereto, a feed roll above the mandrel, means for engaging the coil on the mandrel with the feed roll, and means for rotating the feed roll.

5. A device for uncoiling skelp or the like comprising a mandrel, means for conveying a coil of skelp to the mandrel, a feed roll for engaging the coil on the mandrel, stripping means for the coil mounted adjacent to the feed roll and the mandrel, pinch rolls mounted adjacent to the stripping means, means for raising the coil on the mandrel into engagement with the feed roll, and means for rotating the feed roll and the pinch rolls to uncoil the skelp and advance the same.

6. A device for uncoiling skelp or the like comprising a mandrel, means for conveying a coil of skelp to the mandrel, a feed roll for engaging the coil on the mandrel, stripping means for the coil mounted adjacent to the feed roll and the mandrel, a pressure roll to hold the skelp in contact with the stripping means, pinch rolls adjacent to the pressure roll, means for raising the coil on the mandrel into engagement with the feed roll, and means for rotating feed roll and pinch rolls to uncoil the skelp.

7. A device for uncoiling skelp or the like comprising a mandrel, means for conveying a coil of skelp to the mandrel, a feed roll for engaging the coil on the mandrel, stripping means for the coil mounted adjacent to the feed roll and the mandrel, a pressure roll to hold the skelp in contact with the stripping means, pinch rolls adjacent to the pressure roll, means for guiding the skelp horizontally from the pinch rolls, means for raising the coil on the mandrel into engagement with the feed roll, and co-acting means for rotating feed roll and pinch rolls to uncoil the skelp.

8. An uncoiling device for coils of skelp or the like comprising a mandrel for receiving and supporting a coil, a car for initially receiving the coil, means for reciprocating the car to place the coil on the mandrel, a feed roll mounted above the mandrel, means for raising the mandrel and the coil mounted thereon into pressing engagement with the feed roll, and means for rotating the feed roll to uncoil the skelp.

9. An uncoiling device for coils of skelp or the like comprising a mandrel for receiving and supporting a coil, a car for initially receiving the coil, means for reciprocating the car to place the coil on the mandrel, a feed roll mounted above the mandrel, means for raising the mandrel and the coil mounted thereon into pressing engagement with the feed roll, means for rotating the feed roll, and means engaging the periphery of the coil tangentially beneath the outer end thereof for opening the end of the coil.

10. A device for uncoiling skelp or the like comprising a mandrel, means for placing a coil of skelp on the mandrel, a feed roll for gripping the coil on the mandrel, a fluid pressure cylinder, trunnions on said fluid pressure cylinder, pedestals in which said trunnions are journaled, an auxiliary pedestal adjacent thereto, a shaft journaled in one pedestal and the auxiliary pedestal, a pair of guard arms keyed to said shaft for holding the coil in position, a piston-rod actuated within the fluid pressure cylinder, a crank arm pivotally connecting the piston rod and the shaft for lowering the guard arms, stops for limiting the movement of the guard arms, and means for rotating the feed roll to advance the skelp.

11. An uncoiling device for coils of skelp or the like comprising a mandrel for receiving and supporting a coil, a car for initially receiving the coil, fluid pressure means for reciprocating the car to place the coil on the mandrel, a feed roll mounted above the mandrel, fluid pressure means for raising the mandrel and the coil mounted thereon into pressing engagement with the feed roll, and means for rotating the feed roll to uncoil the skelp.

12. An uncoiling device for coils of skelp or the like comprising a pair of side frames, a slide-way formed in each side frame, a bearing mounted in each slide-way, a shaft supported in the bearings having an extending end portion, a mandrel rotatably mounted on the extending portion of the shaft, a car for initially receiving the coil, means for reciprocating the car to place the coil on the mandrel, a feed roll mounted above the mandrel, means for raising the mandrel and coil mounted thereon into pressing engagement with the feed roll, means for rotating the feed roll to uncoil the skelp and a pair of pinch rolls for advancing the skelp.

13. A device for uncoiling and feeding a coil of skelp or the like which comprises a transfer car, rotatable rollers on the car for supporting the coil, means for rotating the rollers, tracks for the transfer car, means for reciprocating the car on the tracks, a stationary frame at one end of said tracks, a slide-way in the frame, a rotatable mandrel elevatably mounted in said slide-way, a rotatable feed-roll mounted above and parallel to the mandrel, means for vertically reciprocating the mandrel to receive the coil and engage it tightly against the feed roll, side retaining members arranged pivotally on the frame to center the coil on the mandrel, another adjacent fixed frame, suitable stripping means for engaging the coil thereon, a pressure roll to hold the skelp in contact with the stripping means, a pair of pinch rolls to draw the skelp between the stripping means and the pressure roll, plates arranged to guide the skelp, and co-acting means for driving the feed roll and pinch rolls for advancing the skelp.

14. A device for uncoiling and feeding a coil of skelp or the like comprising a transfer car to initially receive the coil, rotatable rollers on the car for supporting the coil, a motor for rotating the rollers, tracks for the transfer car, a fluid pressure cylinder for reciprocating the car on the tracks, a stationary frame at one end of the tracks, a slide-way in said frame, a bearing in said slide-way, a shaft mounted in the bearing, a hollow mandrel rotatably mounted on said shaft, a rotatable feed roll mounted above and parallel to the mandrel, means for vertically reciprocating the mandrel shaft to engage the coil on the mandrel against the feed roll, side retaining members arranged pivotally on the frame to center the coil on the mandrel, a fluid pressure cylinder to raise and lower the retaining members, another fixed frame, a stripping plate for engaging the coil thereon, a pressing roll to hold the skelp in contact with the stripping plate, a pair of pinch rolls to draw the skelp between the stripping plate and the pressing roll, plates arranged to guide the skelp, and co-acting means for driving the feed roll and pinch rolls to advance the skelp.

15. A device for feeding a coil of skelp or the like comprising a transfer car to initially receive the coil, rollers on the car for supporting the coil, a motor for rotating the rollers, a backing plate on the car to hold the coil in position, tracks for the transfer car, a fluid pressure cylinder for reciprocating the car on the tracks, a stationary frame at one end of the tracks, a slide-way in said frame, an extended shaft vertically movable within the slide-way, a hollow mandrel rotatably mounted on one end of the shaft, a rotatable feed roll mounted above and parallel to the mandrel, a fluid pressure cylinder for vertically reciprocating the mandrel shaft to engage the coil on the mandrel against the feed roll, side retaining members arranged pivotally on the frame to center the coil on the mandrel, a fluid pressure cylinder to raise and lower the retaining members, a fixed frame disposed adjacent to the mandrel, a stripper plate for engaging the coil mounted thereon, a pressure roll to hold the skelp in contact with the stripper plate, a fluid pressure cylinder to reciprocate the pressure roll, a pair of pinch rolls to apply tension to the skelp, guide plates arranged to lead the skelp from the pinch rolls, and means for driving the rolls.

16. A device for feeding a coil of skelp or the like as in a continuous butt-weld pipe mill, comprising a reciprocable transfer car adapted to initially receive the coil thereon, rotatable rollers for initially receiving and rotating the coil on the transfer car, means for rotating the rollers, a backing plate on the transfer car to support the coil, bars for guiding the backing plate, a threaded bolt to adjust the backing plate, lock nuts to hold the plate in fixed adjustment, tracks for the transfer car, means for reciprocating the transfer car, a frame adjacent to the tracks, a slide-way on the frame, a rotatable mandrel elevatably mounted in said slide-way, a rotatable feed roll mounted above the mandrel on the frame, means for reciprocating the mandrel to receive the coil and engage it tightly against the feed roll, reciprocable side retaining members arranged pivotally on the frame to center the coil on the mandrel, a second fixed frame adjacent to the first, a stripper plate thereon, a reciprocable pressing roll to hold the skelp in contact with the stripper plate, a pair of pinch rolls for pulling the skelp, plates to guide the skelp, and co-acting means for rotating the feed roll and pinch rolls to advance the skelp.

17. In a device for uncoiling and feeding coils of skelp or the like comprising a pair of side frames, a slide-way formed in each side frame, a bearing mounted in each slide-way, a tubular member integrally connecting the bearings mounted in the slide-ways, a mandrel shaft mounted in the bearings, a mandrel adapted to receive a coil mounted for rotation on one end of the mandrel shaft, a link adjacent to each side frame pivoted on the mandrel shaft, a lifting lever pivoted to the links, a feed roll mounted for rotation above the mandrel adapted to co-act with the mandrel and feed the coil of skelp, and fluid pressure means pivoted to the lifting lever for raising and lowering the mandrel.

18. A device for uncoiling and feeding skelp or the like comprising a reciprocable transfer car adapted to receive a coil of skelp thereon, a fluid pressure cylinder for reciprocating the car, a side frame disposed adjacent to the car, a slide-way in the side frame, a bearing in the slide-way, a mandrel shaft supported in the bearing, a mandrel mounted for rotation on one end of the mandrel shaft adapted to receive a coil from the transfer car, a feed roll above the mandrel, a lifting lever pivotally connected to the mandrel shaft, a fluid pressure cylinder pivotally attached to the lifting lever, means for controlling the supply of fluid to and from the cylinders, and means for rotating the feed roll and mandrel to advance the skelp.

19. In a device for uncoiling and feeding a coil of skelp or the like comprising a pair of side frames, a slide-way formed in each side frame, a bearing mounted in each slide-way, a mandrel shaft supported in the bearings, a mandrel mounted for rotation on one end of the mandrel shaft adapted to receive a coil of skelp, a lifting lever having a pivotal connection with the mandrel shaft at one side of each of the side frames, a feed roll mounted above the mandrel for engaging and feeding the skelp on the mandrel, and fluid pressure means pivoted to the lifting lever for raising and lowering the mandrel.

20. A device for uncoiling skelp or the like comprising a reciprocable transfer car adapted to receive a coil of skelp thereon, a fluid pressure cylinder disposed thereunder for reciprocating said transfer car, a frame adjacent thereto, a a slide-way in the frame, a mandrel elevatably disposed in the slide-way, a pressure feed roll above the mandrel, a lifting lever pivotally connected to and beneath the mandrel, a fluid pressure cylinder pivotally attached to the lifting lever, a reservoir tank containing fluid, a pump for drawing the fluid from the tank, a motor for driving the pump, a pipe connected to the pump, four-way valves connected thereto to control the supply of fluid to and from the cylinders, pipes for connecting said valves to opposite ends of the cylinders, a pipe for returning spent fluid from the cylinders to the tank, and means for driving the pressure feed roll.

21. A device for uncoiling and feeding a coil of skelp or the like, comprising a mandrel, means for placing a coil of skelp on the mandrel, a feed roll for gripping the coil on the mandrel, a fluid pressure cylinder pivotally mounted in pedestals adjacent to the mandrel, a shaft journaled in the pedestals, a pair of guard arms adjustably mounted on said shaft for holding the coil in position on the mandrel, a crank arm keyed to the shaft and pivotally connected to the fluid pressure cylinder for raising and lowering the guard arms, stops for limiting the movement of the guard arms, and co-acting means for rotating the mandrel and feed roll to advance the skelp.

22. A device of the character described comprising a reciprocable transfer car for initially receiving a coil of skelp or the like, a track for guiding the car, a frame adjacent to the track, a rotatable mandrel elevatably mounted on said frame, means for reciprocating the car to place the coil on the mandrel, a rotatable feed roll above the mandrel, means for vertically raising the mandrel to engage the coil thereon tightly against the feed roll, a second frame adjacent to the first, a stripping plate for engaging the coil thereon, a pressure roll to hold the skelp against the stripping plate, pinch rolls to pull the skelp, plates to guide the skelp, and driving means for rotating the feed roll and pinch rolls.

23. An uncoiling device for coils of skelp or the like comprising a base, a pair of side frame members mounted thereon, web-plates connecting said side members, a vertical slide-way in each side frame member, bearings mounted in said slide-ways, a tubular portion integrally connecting said bearings, a mandrel shaft in said tubular portion journaled in said bearings and extending outwardly and reduced at one end, an enlarged central portion of the mandrel shaft, sleeves thereon, a link pivoting at its upper end on said sleeves, an extending opposite end of the mandrel shaft, roller bearings thereon, a mandrel rotatably mounted on said bearings, means for conveying a coil of skelp to the mandrel, pedestals on the base, a second shaft supported thereon, a lifting lever pivoting on said second shaft at its upper ends and on the link aforesaid at its lower ends, a rotatable feed roll above the mandrel, means for raising the lifting lever to engage the coil on the mandrel with the feed roll, and means for rotating the feed roll.

24. A device for feeding a coil of skelp or the like into machines in the process of making buttwelded pipe, comprising a reciprocable transfer car adapted to receive the coil thereon, rotatable rollers for supporting and rotating the coil on the transfer car, means on the car for backing the coil, tracks for the transfer car, fluid pressure means for reciprocating the car on the tracks, a stationary frame at one end of the tracks, a slideway in the frame, a rotatable mandrel elevatably mounted in said slide-way, a rotatable feed roll mounted above the mandrel, means for vertically reciprocating the mandrel to raise the coil and engage it tightly against the feed roll, side retaining guards arranged pivotally on the frame to center the coil on the mandrel, a second fixed frame, a stripper plate thereon, a reciprocable pressing roll to hold the skelp in contact with the stripper plate, a pair of pinch rolls to draw the skelp between the stripper plate and the pressing roll, plates arranged to guide the skelp, and co-acting means for driving the feed roll and pinch rolls to advance the skelp.

25. An uncoiling device for coils of skelp or the like comprising a base, a pair of side frame members mounted thereon, a mandrel elevatably mounted on said side frame members for receiving a coil, means for placing the coil on the mandrel, a bearing in the side frame member adjacent to the mandrel, an outwardly extending bracket in the opposite side frame member aligned therewith, a gear casing mounted on said bracket, a journal bearing therein, roller bearings within the said bearings, a tubular member connecting the bearings, a feed roll shaft journaled in the roller bearings, a feed roll keyed to one end of the feed roll shaft in vertical alignment with the mandrel, a bevel gear attached to the opposite end of the feed roll shaft, a second bevel gear meshing with the first in the gear casing, a shaft attached to the second bevel gear, means for driving said shaft, and means for vertically raising the mandrel to engage the coil tightly against the feed roll.

26. A device for uncoiling and feeding a coil of skelp or the like, comprising a mandrel, a feed roll disposed above the mandrel, means operated by fluid pressure for adjusting the mandrel to receive the coil and raise the coil into engagement with the feed roll, guards operated by fluid pressure adapted to retain the coil in position on the mandrel, and means for rotating the feed roll and mandrel to advance the skelp.

27. A device for uncoiling and feeding a coil of skelp or the like, comprising a mandrel, a feed roll disposed above the mandrel, a reciprocating car having a pair of driven rolls mounted thereon adapted to initially receive the coil and place it on the mandrel, means operated by fluid pressure for adjusting the mandrel to receive the coil and to raise said coil into engagement with the feed roll and for lowering the coil and mandrel to support the coil and feed the skelp from the driven rolls of the car, guards operated by fluid pressure adapted to retain the coil in position on the mandrel, and means for rotating the feed roll and mandrel to initially advance the skelp.

28. A device of the character described, comprising a reciprocable transfer car for initially receiving a coil of skelp or the like, backing means on the car for holding the coil upright, a frame, a horizontal rotatable mandrel adapted for vertical reciprocation thereon, means for moving the car to place the coil on the mandrel, a feed roll mounted above and parallel to the mandrel and adaptable to engage and feed the skelp to unwind it from the coil, means for elevating the mandrel for such engagement, a second frame, a stripper plate thereon for opening the coil, a reciprocable pressing roll with axis of reciprocation approximately 60° to the stripper plate at the pass line, means for reciprocating the pressing roll, a pair of pinch rolls for pulling the skelp, a pair of converging plates to guide the strip, and means for rotating feed roll and pinch rolls to advance the skelp.

29. A device for uncoiling a coil of skelp or the like, comprising a reciprocable transfer car having rollers thereon for receiving the coil, a mandrel adjacent to the car, means for adjusting the mandrel in alignment with the center of the coil, means for advancing the car to place the coil on the mandrel, a feed roll above the mandrel, means for raising the mandrel to grip and engage the coil against the feed roll and for lowering the mandrel to place the coil on the car rollers, means inserted beneath the end of the coil for opening the coil, means for rotating the feed roll to unwind the coil, means for pulling the skelp from the coil, and means for rotating the rollers on the car to feed the skelp therefrom.

TOM WILSON.

CERTIFICATE OF CORRECTION.

Patent No. 2,280,564. April 21, 1942.

TOM WILSON.

It is hereby certified that error appears in the printed specification of the above numbered patent requiring correction as follows: Page 1, first column, line 17, for "1.230" read --1.130--; page 3, first column, line 16, for "on the" read --or the--; and second column, line 11, claim 1, for "skept" read --skelp--; line 19, claim 2, for "mean" read --means--; page 5, line 61, claim 20, strike out "a" after "thereto,"; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.